April 23, 1935.  B. R. NYHAGEN  1,998,787
PERCH CONSTRUCTION FOR BIRDS OR ANIMALS
Filed Aug. 29, 1933  2 Sheets-Sheet 1

INVENTOR
Barney R. Nyhagen
BY
Clark + Ott
ATTORNEYS

April 23, 1935.  B. R. NYHAGEN  1,998,787
PERCH CONSTRUCTION FOR BIRDS OR ANIMALS
Filed Aug. 29, 1933  2 Sheets-Sheet 2
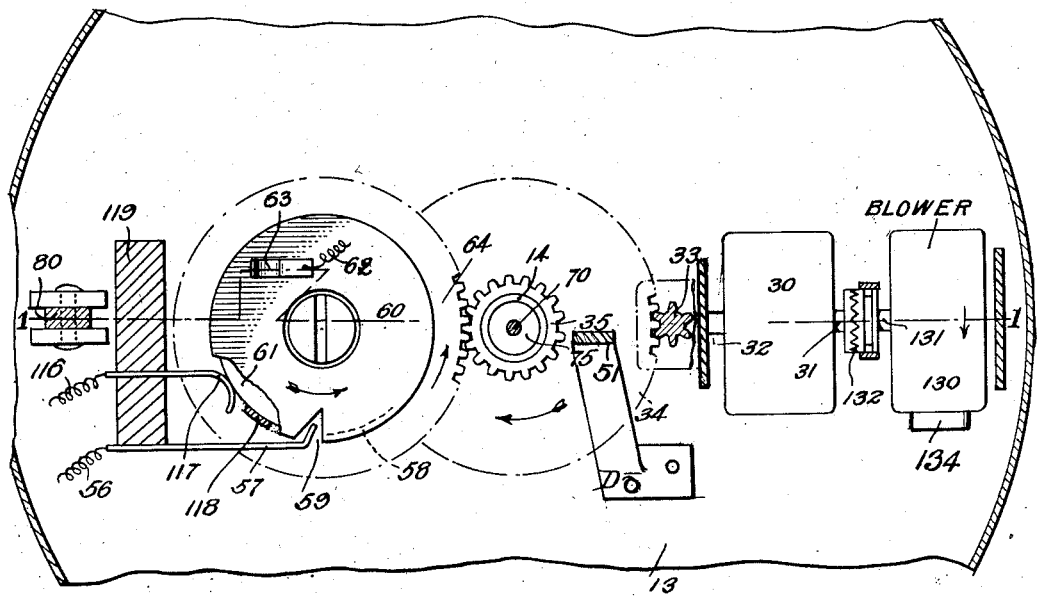
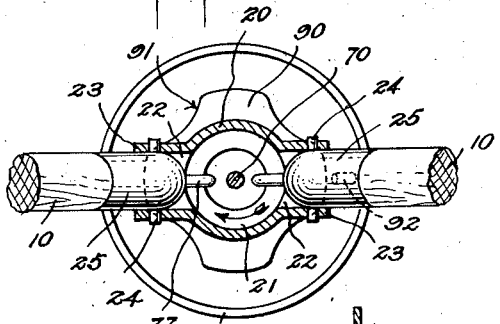
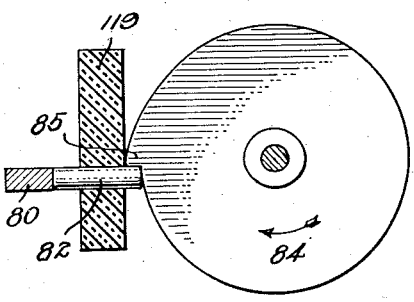
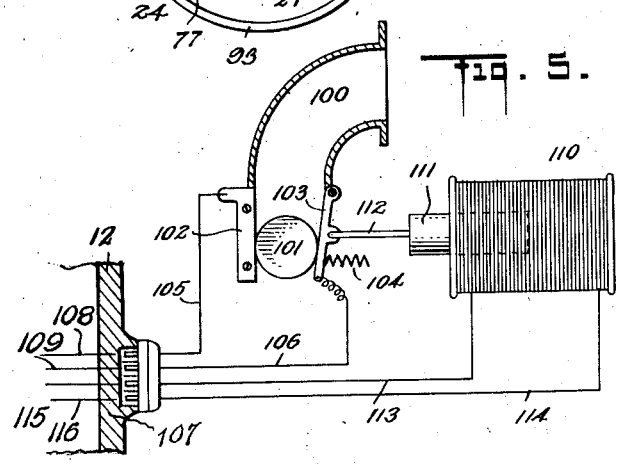
INVENTOR
Barney R. Nyhagen
BY
Clark & Ott
ATTORNEYS Patented Apr. 23, 1935

1,998,787

UNITED STATES PATENT OFFICE 1,998,787

PERCH CONSTRUCTION FOR BIRDS OR ANIMALS

Barney R. Nyhagen, Bronx, N. Y.

Application August 29, 1933, Serial No. 687,275

14 Claims. (Cl. 119—17)

This invention relates to a novelty perch or similar support for pet birds or animals and, while not necessarily restricted to such use, the perch or support is especially designed to be arranged within the cage or pen which houses the bird or animal so as to afford exercise and amusement for the birds or animals as well as amusement for the on-lookers.

The invention broadly comprehends a perch or support which is so constructed and arranged that motion is imparted thereto by a suitable motor and preferably in which the actuation of the motor is either caused or initiated by the bird or animal when its weight is brought to bear upon the perch structure or support or a portion thereof.

More particularly, the invention contemplates a perch or support of the indicated character which includes a perch arm or equivalent support element, together with means for mounting and driving the same so that it moves in an undulating, rotational translatory path.

The invention further resides in the combination with a perch or support of the indicated character, of a motor driven mechanism which is so constructed, arranged and controlled that the bird or animal initiates actuation of the motor, which remains active as long as the weight of the bird or animal is borne by the perch or support, or for a predetermined period of time after each starting of the motor and after which the motor is automatically rendered inactive.

As a further feature, the invention embodies a coin controlled device for rendering the motor driven mechanism operative and in-operative, together with a key actuated switch for optionally permitting the coin controlled device to function or the motor driven mechanism to operate independently of said coin controlled device.

The invention aims for a still further object to provide in combination with the foregoing, a sound reproducing mechanism, in which a record turn table is driven by the motor of the perch or support driving mechanism.

The invention has for another object the provision of a draft or suction creating device or fan driven by the motor and adapted to direct a current of air towards or adjacent the perch or support or for drawing foul air therefrom to ventilate, together with clutch means for optionally rendering said device active and inactive.

Other objects which fall within the purview of the invention are to provide a perch or support structure of the character set forth, which is comparatively simple and not complicated in its construction and mode of operation, which may be economically produced and which is of a highly attractive and amusing nature.

With the above recited and other objects in view, reference is now made to the following specification and accompanying drawings in which there is disclosed, by way of example, a preferred embodiment of the invention, while the claims are intended to cover, in addition to the form shown, other embodiments which fall within their scope.

In the drawings:

Fig. 2 is an enlarged, fragmentary horizontal sectional view taken approximately on the line 2—2 of Fig. 1.

Fig. 3 is an enlarged horizontal, sectional view taken approximately on the line indicated at 3—3 in Fig. 1.

Fig. 4 is a horizontal, sectional view taken approximately on the line 4—4 of Fig. 1.

Fig. 5 is a diagrammatic view of a coin controlled mechanism for use in connection with the device.

Figure 1:
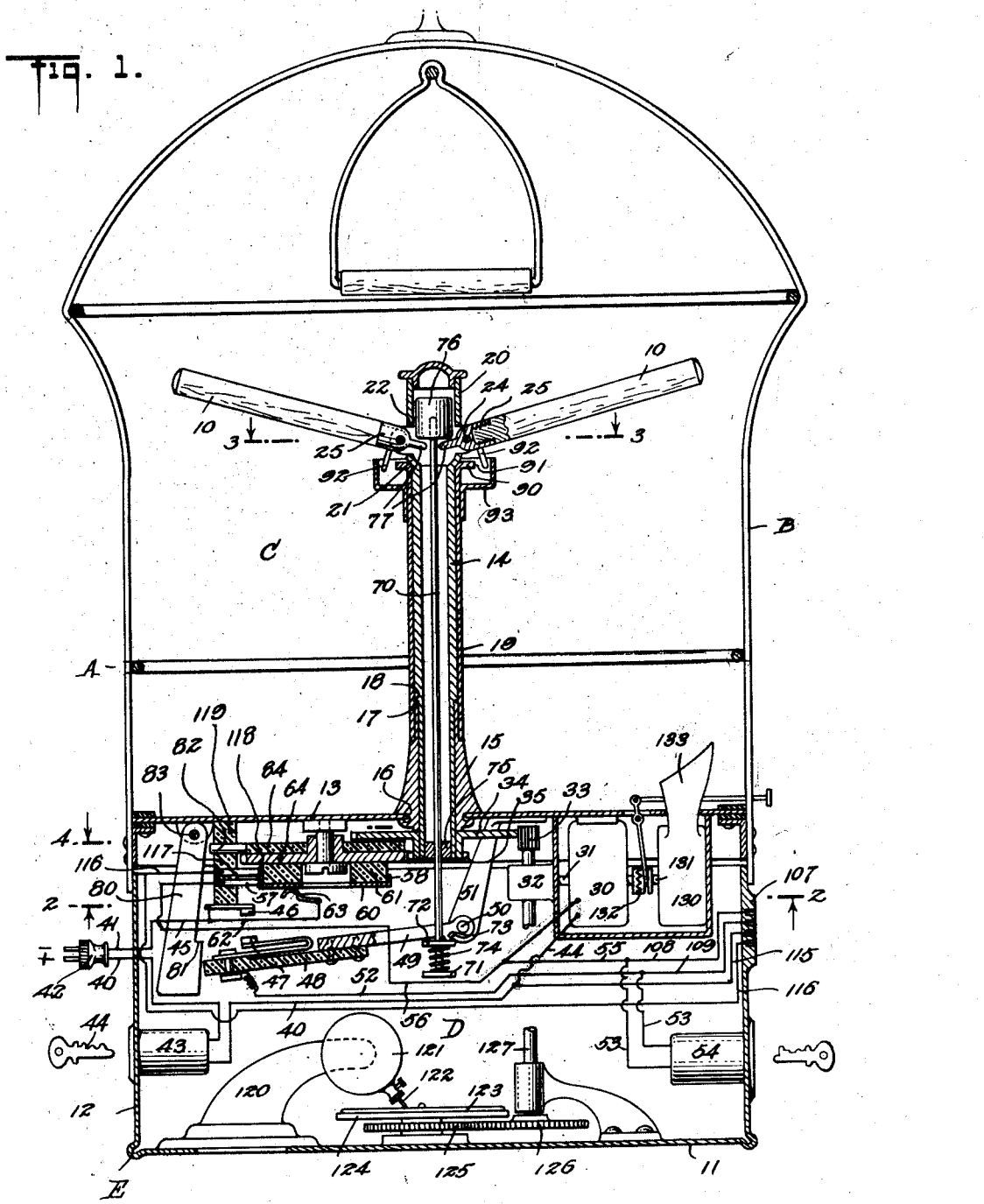
Fig. 1 is a vertical sectional view through a bird cage equipped with a perch structure made up in accordance with the invention, taken approximately on the line 1—1 of Fig. 2.

In the present disclosure, the invention is illustrated as a perch structure, associated with a bird cage, but as previously set forth, this is not intended as a limitation upon the use or scope of the invention, as it is obvious that the perch may equally well be in the form of any type or movably mounted and driven support for a bird or animal, whether the same is located in a cage, pen or other enclosure or in the open.

Referring to the drawings by characters of reference, A designates generally a cage or equivalent enclosure including a main body portion B defining an upper compartment C for housing a bird and in which one or more perch arms 10 are located, two being illustrated in the present instance. The cage also includes a lower compartment D, defined by a hollow base E which encases a motor driven mechanism for imparting movement to the perch arm or arms, said base also housing the controlling means and certain other elements entering into and forming part of the inventive combination.

The base E includes a bottom, 11, an upstanding marginal wall 12 and a top 13 which also serves as a bottom for the upper compartment C. A support 14 for the perch arm or arms is provided, which support is in the form of a hollow cylindrical or tubular shaft mounted for rotation on a vertical axis and preferably disposed centrally of the cage body.

A stationary tubular boss 15 is secured to the base top 13 within a central opening 16, through and from which opening it extends upwardly to provide a bearing surface 17 at its upper end. The support 14 for the perch arm or arms 10 extends through the boss 15 and is formed with an annular shoulder or equivalent bearing 18 which rests upon the upper end or bearing surface 17 of the boss, the said perch arm support or shaft 14 extending upwardly above or beyond said bearing or shoulder 18. The lower end of the perch arm support or shaft 14 depends below the boss and base top and terminates within the lower compartment D, defined by the base E, said lower end being suitably connected with a motor driven mechanism in the manner hereinafter specified. The support or shaft 14 is adapted to rotate within the boss and within an upstanding fixed or non-rotary hollow or tubular standard 19 which is anchored to and carried by the boss and which extends upwardly therefrom. The upper portion 20 of the support or shaft 14 protrudes from the upper end of the standard and is enlarged, thus providing an exterior annular rounded convex shoulder 21 which bears on the upper end of the standard 19. The upper enlarged portion or head 20 of the support or shaft 14 is slotted as at 22 and is provided with bearing lugs or portions 23 to which the perch arms are fulcrumed on fulcrumed pins or trunnions 24. Preferably, as illustrated, the pins are carried by perch arm socket members 25, with which the perch arms are detachably associated by a screw threaded or equivalent connection which admits of their ready detachment for cleansing or other purposes.

The driving mechanism includes a motor or prime-mover 30 which, as shown, is arranged within the lower compartment D and is supported from the underside of the top 13. The motor shaft 31, through suitable reducing gearing in a gear box 32, transmits rotational motion to a pinion 33 which turns on a vertical axis. The depending lower end of the support or shaft 14 has secured thereto gears 34 and 35, the teeth of the former meshing with the teeth of the pinion 33 so that rotation is imparted to the support or shaft 14 when the motor is active.

The primemover, which in the present disclosure, is shown as an electric motor is arranged in a circuit which includes conductors 40 and 41 leading from a source of supply which may be the usual house current, an attachment plug 42 being provided for plugging into the house current. The conductor 40 leads through a switch housed in a lock 43, controlled by a key 44 and by virtue of which the motor circuit may be locked, if desired, to prevent unauthorized operation of the device. After leading through the switch 43, the conductor 40 is connected by a lead-in wire 44 to one side of the motor winding. The other conductor 41 is connected by a branch conductor 45 to the fixed contact 46 of a make and break switch, which includes a resilient movable contact 47 carried by the insulated end section 48 of a lever 49. The lever is fulcrumed at 50 to a bearing bracket 51 which in turn is attached to and depends from the underside of the top 13 of the base E. A conductor wire 52 leads from the resilient movable contact 47 to a branch conductor 53 which extends through a key locked switch 54 and is then connected with a conductor wire 55 which is connected with the other side of the motor winding. A conductor wire 56 is connected to the conductor wire 55 and leads therefrom to a resilient wiper contact 57 which cooperates with and wipes over the surface of a rotary circuit maker and breaker 58 having a gap 59 so as to break the circuit through the wires 40 and 44 to the motor when the gap registers with the wiper contact 57. The rotary circuit maker and breaker 58 is in the nature of a substantially cylindrical rim having an annular flange 60 at its lower edge and defining together therewith a cup shaped element which is secured to an annular insulated carrier 61, the flange 60 underlying the carrier 61 and the rim 58, arranged over or extending circumferentially around the lower portion of the periphery of the carrier except for the gap 59 which registers with a recess formed in the periphery of the carrier 61. A conductor wire 62 is connected with the conductor 45 and leads therefrom to a wiper terminal 63 which is in constant wiping contact with the conductor flange 60 of the rotary circuit maker and breaker.

The carrier 61 is secured to the underside of a gear 64, the teeth of which mesh with the teeth of the gear 35 and the ratio of the gears 35 and 64 is such that the gear 64 will be rotated at a relatively slower speed than the speed of rotation imparted to the perch arm support or shaft 14. It will thus be observed that the perch arm support or shaft 14 will be caused to turn about its axis approximately three times to each complete rotation of the gear 64.

In order to provide an arrangement for swinging the lever 49 upwardly to engage with the contacts 46 and 47, to close the motor circuit and start motor, which arrangement is such as to be actuated by the bird when its weight is brought to bear upon one of the perch arms 10, a lift rod 70 is employed. The lift rod is provided at its lower end with a fixed head 71 and a relatively movable guided lever bearing element 72 which is yieldably engaged with a thrust lug 73 by means of a coiled expansion spring 74, interposed between the head and the lever bearing element 72 and surrounding the lower end of the lift rod. The lift rod extends upwardly through the perch arm support or shaft 14 and through a guide 75 at the lower end thereof and has secured to its upper end a head 76 which is vertically movable and guided in the enlarged headed upper end 20 of the support or shaft 14. The perch socket members are provided with inwardly projecting studs 77 which engage under the head 76 so that when the perch arms 10 are relieved of the weight of the bird, the combined weight of the head 76, the lift rod 70, the lever 49, and parts carried thereby, swing the perch arms upwardly to the position illustrated in Fig. 1. The weight of these parts, however, is such that the weight of the bird when brought to bear on one of the perch arms, in addition to the leverage of the perch arm, serves to elevate the lift rod 70. The raising or elevating of the lift rod 70 swings the lever 49 upwardly and brings the movable contact 47 into engagement with the fixed contact 46 thereby closing the motor circuit and initiating the starting of the device. When the lever 49 is elevated, a gravity latch 80 swings to a position to dispose its bill 81 under the free insulated end section 48 of the lever 49 and thereby retains the contacts 45 and 47 engaged.

In order to provide means for swinging the gravity latch 80 to release position, a movable thrust pin 82 is supported adjacent the upper fulcrumed end 83 of the latch and a cam 84 is secured to the upper side of the gear 64 and is provided with a single high point 85 on its periphery which engages with and cams the thrust pin 82 to a position to swing the latch 80 to release position. It is, of course, to be understood that the high point is so located that the release of the latch will be effected only after the cam has made a complete revolution and just prior to the time when the wiper 57 enters the gap 59.

Obviously, various motions may be imparted to the perch arms 10, in addition to the rotational, translatory motion caused by the turning of the support or shaft 14. In the present instance, the perch arms are caused to swing up and down so that combined with the rotational translatory motion, they move in an undulating path. This is accomplished by providing the upper end of the standard 19 with a horizontally disposed cam 90 having an undulating periphery 91 and providing each perch socket member 25 with a depending cam pin 92, the cam pin being moved into contact with the undulating periphery 91 when the perch arm is swung downwardly under the weight of the bird. In order to protect and shield the bird from becoming entangled with the cam and cam pin, a protecting cover 93 is secured to the standard and extends around the cam 90.

It should also be noted that the spring pressed bearing element 72 of the lift rod compensates for the necessary lost motion between the lever 49 and the lift rod so that after the switch is closed and latched, there is sufficient play in the lift rod and head 76 to allow the cam 90 to function.

The device may be coin controlled, if desired, and the coin controlled means is optionally employed or cut out by the key actuated lock switch 54. The coin control, as illustrated, consists of a coin chute 100 which directs the coin 101 to a circuit closer, including a fixed contact 102 and a swingable contact 103 which is normally swung by a spring 104 to an angular position to admit the coin between the contacts 102 and 103 for bridging the same and for retaining the coin in bridging position. A conductor wire 105 leads from the fixed contact 102 and a conductor wire 106 leads from the swingable contact 103. The conductors 105 and 106 are designed to be plugged into a socket 107 from which socket a conductor 108 leads to the point of juncture of the conductors 53 and 55. A conductor 109 leads from the socket 107 to the point of juncture of the conductors 52 and 53 so that when the switch 54 is turned to an open position, the current will flow from the source of supply through the wires 40 and 44, to one side of the motor winding thence through wire 55, wire 108, wire 105 and to contact 102. When the coin 101 is inserted, it bridges contacts 102 and 103 and the current then flows through the coin, contact 103 and conductor 106, thence through conductor 109 and wire 52 to movable contact 47 thereby setting the device, through the coin controlled means, ready for operation when the weight of the bird is brought to bear on the perch arm 10. In order to provide means for automatically releasing the coin after a predetermined cycle of operation, a solenoid 110 is provided, the core 111 of which is connected by a link 112 to the swingable contact 103. Conductors 113 and 114 lead from the solenoid winding and are plugged into the socket 107. Conductors 115 and 116 with which the conductors 113 and 114 respectively connect, lead from the socket 107 and the conductor 115 is tapped into the circuit wire 40. The conductor 116 leads to a resilient wiper contact 117 which is supported and disposed in such a manner as to wipe over the periphery of the insulated carrier 61 at a point above the circuit maker and breaker rim 58. At one point in its circumference, the rim 58 is provided with an upstanding contact lug 118, with which the wiper contact 117 engages after the gear 64 has made approximately a complete revolution. This serves to complete the circuit to the solenoid for energizing the same and drawing in the core 111 thus swinging the contact 103 away from the coin to release and drop the same into a suitable coin receptacle, not shown. The circuit to the solenoid is completed by the current flowing through wire 40 thence through wire 115, conductor 113, the solenoid winding, conductor 114, conductor 116, wiper contact 117, lug 118, rim 58, wiper terminal 63, conductor 62 and conductor 41 of the source of supply. The contact of wiper 117 with lug 118 is only momentary but it is sufficient to release the coin.

In addition to the other features of the combination, previously described, the device may include, as a part thereof, a sound reproducing device which includes a tone arm 120, supported by and having its outlet registering with and opening in the bottom 11 of the base E. A sound box 121 is supported by the arm and carries the usual stylus 122 which is designed to contact with a disc record 123 supported on a turn table 124 which is driven by meshing gears 125 and 126, the latter being connected by a shaft 127 to the gearing within the gear box 32. It will be understood that when the motor is in operation and the stylus is in contact with the record 123, the record will be rotated to reproduce the sounds recorded thereon.

As a further feature of the combination, there is provided a draft or suction creating means in the form of a conventional blower or suction fan 130, the shaft 131 of which is optionally connected with the motor shaft 31 by means of a clutch 132. The blower outlet or suction intake 133 extends through the top 13 and is positioned so as to direct a draft of air towards or adjacent the perch structure or withdraw air therefrom, while the combined blower inlet and suction outlet is shown at 134.

What is claimed is:

1. A perch or support for birds or animals comprising a substantially horizontally disposed arm, means for mounting the arm to turn in a generally horizontal path around the mounting, a motor driven means for imparting motion to the arm and means operable by the weight of the bird or animal on the arm for rendering said motor driven means active to impart motion to the arm.

2. A perch or support for birds or animals comprising an arm, a mounting therefor, a motor driven means for imparting undulating motion to the arm and means operable by the weight of the bird or animal on the arm for rendering said motor driven means active to impart motion to the arm.

3. A perch or support for birds or animals comprising a substantially horizontally disposed arm, a mounting therefor about which the arm is adapted to move in a generally horizontal path, a motor driven means for causing the arm to move around the mounting, and means operable by the weight of the bird or animal on the arm for rendering said motor driven means active to impart motion to the arm.

4. A perch or support for birds or animals comprising an arm, a mounting therefor, a motor driven means for causing the arm to move around the mounting and for imparting thereto an undulating motion and means operable by the weight of the bird or animal on the arm for rendering said motor driven means active to impart motion to the arm.

5. A perch or support for a bird or animal, including a substantially horizontally disposed arm, a mounting therefor about which the arm is adapted to move in a substantially horizontal path, motor driven means for imparting motion to the arm, means operable by the weight of the bird or animal on the arm for rendering the motor driven means active to impart motion to the arm and means operable to render the motor driven means inactive if the arm is free of the weight of the bird or animal.

6. A perch or support for a bird or animal, including a substantially horizontally disposed arm, a mounting therefor about which the arm is adapted to move in a substantially horizontal path, motor driven means for imparting motion to the arm, means operable by the weight of the bird or animal on the arm for rendering the motor driven means active to impart motion to the arm and means operable to render the motor driven means inactive after a predetermined time and if the arm is free of the weight of the bird or animal.

7. In a device of the character set forth, a member fulcrumed to a support for movement in a generally horizontal path about said support and adapted to be moved by the weight of a bird or animal when the weight is brought to bear thereon, motor driven mechanism for causing said member to move completely around its support and control means connected with the member for rendering said mechanism active when moved through the medium of said member by the weight of the bird or animal thereon.

8. A perch for birds or animals comprising a substantially horizontal arm, a rotary mounting therefor with and about which the arm is adapted to move in a substantially horizontal path, motor driven means for imparting rotary motion to said mounting and means operable by the weight of the bird or animal on the arm for rendering said motor driven means active.

9. A perch for birds or animals comprising an arm, a rotatable mounting for said arm and with which said arm moves, a guide for said mounting, motor driven means for imparting rotary motion to the mounting and cooperating means carried by said guide and by said arm for imparting undulating motion to the arm as it moves with the mounting and means operable by the weight of the bird or animal on the arm for rendering said motor driven means active to impart motion to the arm.

10. A perch for birds or animals comprising an arm, a rotatable mounting for said arm and with which the arm moves, a guide for said mounting, an electric circuit including a motor, means driven by said motor for imparting rotary motion to said mounting, cooperating means carried by said guide and by said arm for imparting undulating motion to the arm as it moves with the mounting and means including a switch in said motor circuit and a connection between the switch and the perch arm operable by the weight of the bird or animal on the arm to move the switch so as to close the circuit and render the motor driven means active.

11. A perch for birds or animals comprising an arm, a rotatable mounting for said arm and with which the arm moves, a guide for said mounting, an electric circuit including a motor, means driven by said motor for imparting rotary motion to said mounting, cooperating means carried by said guide and by said arm for imparting undulating motion to the arm as it moves with the mounting, means including a switch in said motor circuit and a connection between the switch and the perch arm operable by the weight of the bird or animal on the arm to move the switch so as to close the circuit and render the motor driven means active and circuit breaker means in said motor circuit operable upon the completion of a predetermined number of rotations of the perch arm mounting to break the circuit.

12. In combination, a perch for birds or animals, including a perch arm and a mounting therefor, a draft creating means for directing a draft adjacent the perch arm, means for transmitting motion to the perch arm and a common means for actuating said motion transmitting means and the draft creating means.

13. A perch for birds or animals comprising a perch arm, a mounting therefor, an electric circuit including a motor, means driven by the motor for imparting motion to the arm, and a switch in said motor circuit operable by the weight of the bird or animal on the arm to close the circuit for rendering said motor driven means active to impart motion to the arm.

14. A perch for birds or animals comprising a perch arm, a mounting therefor, an electric circuit including a motor, means driven by the motor for imparting motion to the arm, a switch in said motor circuit operable by the weight of the bird or animal on the arm to close the circuit for rendering said motor driven means active to impart motion to the arm, coin controlled mechanism operable to make said motor circuit, and magnetically operable means to break said circuit.

BARNEY R. NYHAGEN.